(12) United States Patent
Solum

(10) Patent No.: US 9,131,322 B2
(45) Date of Patent: Sep. 8, 2015

(54) METHOD AND APPARATUS FOR COMMUNICATION BETWEEN HEARING ASSISTANCE DEVICES IN A BLUETOOTH NETWORK

(71) Applicant: Starkey Laboratories, Inc., Eden Prairie, MN (US)

(72) Inventor: Jeffrey Paul Solum, Shorewood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 13/937,013

(22) Filed: Jul. 8, 2013

(65) Prior Publication Data

US 2015/0010179 A1 Jan. 8, 2015

(51) Int. Cl.
H04R 25/00 (2006.01)
H04M 1/725 (2006.01)
H04W 84/22 (2009.01)
H04W 88/04 (2009.01)

(52) U.S. Cl.
CPC .......... H04R 25/558 (2013.01); H04M 1/7253 (2013.01); H04R 25/554 (2013.01); H04W 84/22 (2013.01); H04W 88/04 (2013.01)

(58) Field of Classification Search
CPC ........ H04R 25/60; H04R 25/63; H04R 25/65; H04R 25/70; H04R 25/356; H04R 25/456; H04R 25/52; H04R 25/505; H04R 25/552; H04R 25/554; H04R 25/558; H04R 25/604; H04R 25/652; H04R 2225/021; H04R 2225/025; H04R 225/41

USPC .................. 381/312, 314, 315, 327, 328, 329
See application file for complete search history.

(56) References Cited

U.S. PATENT DOCUMENTS

| | | | |
|---|---|---|---|
| 6,694,143 B1 * | 2/2004 | Beamish et al. | 381/315 |
| 7,359,950 B2 | 4/2008 | Choi et al. | |
| 7,496,065 B2 | 2/2009 | Anjum et al. | |
| 7,688,991 B2 * | 3/2010 | Baechler et al. | 381/315 |
| 8,194,902 B2 | 6/2012 | Pedersen | |
| 8,229,146 B2 | 7/2012 | Nielsen | |

FOREIGN PATENT DOCUMENTS

| | | |
|---|---|---|
| EP | 2200344 A2 | 6/2010 |
| EP | 2439960 A1 | 4/2012 |
| EP | 2456234 A1 | 5/2012 |

OTHER PUBLICATIONS

"European Application Serial No. 14175910.0, Extended European Search Report mailed Nov. 12, 2014", 7 pgs.

* cited by examiner

*Primary Examiner* — Brian Ensey (74) *Attorney, Agent, or Firm* — Schwegman Lundberg & Woessner, P.A.

(57) ABSTRACT

A hearing assistance system provides for wireless communication between hearing assistance devices that are in a Bluetooth connection with a host device. In various embodiments, during a Bluetooth connection interval, one or more time slots are used for communication between the host device and one or more of the hearing assistance devices, while one or more additional time slots are reserved for communication between the hearing assistance devices.

25 Claims, 6 Drawing Sheets

METHOD AND APPARATUS FOR COMMUNICATION BETWEEN HEARING ASSISTANCE DEVICES IN A BLUETOOTH NETWORK

TECHNICAL FIELD

This application relates generally to wireless networks and, more particularly, to systems and methods for providing hearing assistance devices with wireless communication between each other while in a Bluetooth connection with a host device.

BACKGROUND

Hearing assistance devices include a variety of devices such as assistive listening devices, cochlear implants, and hearing aids. Hearing aids are useful in improving the hearing and speech comprehension of people who have hearing loss by selectively amplifying certain frequencies according to the hearing loss of the subject. A hearing aid typically includes a microphone, an amplifier and a receiver (speaker). The microphone receives sound (acoustic signal) and converts it to an electrical signal and sends it to the amplifier. The amplifier increases the power of the signal, in proportion to the hearing loss, and then sends it to the ear through the receiver. Cochlear devices may employ electrodes to transmit sound to the patient.

Wireless communication technology such as Bluetooth provides hearing assistance devices, such as hearing aids, with capability of wirelessly connecting to host devices for programming, controlling, and/or streaming audio to the hearing assistance devices. Such host devices may be implemented as dedicated host devices or implemented in general-purpose devices such as telephones, television sets, computers, and music players. To provide a listener with sound reflecting a realistic acoustic environment using multiple hearing assistance devices, such as a pair of hearing aids for the listener's left and right ears, there is a need for providing wireless communication between the host device and each of the hearing assistance devices as well as between the hearing assistance devices.

SUMMARY

A hearing assistance system provides for wireless communication between hearing assistance devices that are in a Bluetooth connection with a host device. In various embodiments, during a Bluetooth connection interval, one or more time slots are used for communication between the host device and one or more of the hearing assistance devices, while one or more additional time slots are reserved for communication between the hearing assistance devices.

In one embodiment, a hearing assistance system includes a host device, a plurality of hearing assistance devices, one or more first wireless communication links, one or more second wireless communication links, and a network control system. The host device includes a master control circuit. The plurality of hearing assistance devices includes a slave control circuit in each of the hearing assistance devices. The one or more first wireless communication links are each configured to communicatively couple a hearing assistance device of the plurality of hearing assistance devices to the host device using a Bluetooth protocol. The one or more second wireless communication links are each configured to communicative couple a hearing assistance device of the plurality of hearing assistance devices to another hearing assistance device of the plurality of hearing assistance devices. The network control system, which is implemented in the master control circuit and the slave control circuits, is configured to assign one or more first time slots for the communication over each first link of the one or more first wireless communication links within a Bluetooth connection interval and one or more second time slots for the communication over each second link of the one or more second wireless communication links within the Bluetooth connection interval. The first and second time slots are non-overlapping in time.

In one embodiment, a method for wireless communication in a hearing assistance system is provided. One or more first wireless communication links each communicatively coupling a hearing assistance device of a plurality of hearing assistance devices to a host device using a Bluetooth protocol are provided. One or more second wireless communication links each communicatively coupling a hearing assistance device of the plurality of hearing assistance devices to another hearing assistance device of the plurality of hearing assistance devices are provided. One or more first time slots for communication over each first link of the one or more first wireless communication links during a Bluetooth connection interval and one or more second time slots for communication over each second link of the one or more second wireless communication links during the Bluetooth connection interval are assigned. The first and second time slots are non-overlapping in time.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This document discusses a system including multiple devices communicatively coupled with each other using wireless technology. An example of the system includes a master device communicating with each device of a plurality of slave devices using a Bluetooth protocol, which does not provide for the slave devices to communicate with one another without going through the master device. However, direct communication between the slave devices may be desirable. For example, a hearing assistance system includes a host device as the master device and a plurality of hearing assistance devices, such as a pair of left and right hearing aids, each as one of the slave devices. Direct communication between the hearing assistance devices, such as direct ear-to-ear communication between the left and right hearing aids, allows for sound processing that provides the listener with realistic sound effects. The present system provides for wireless communication between the slave devices while the slave devices are in a Bluetooth connection with the master device. In various embodiments, bandwidth is reserved to allow for wireless communication between the slave devices a Bluetooth network. In various embodiments using Bluetooth technology, one or more time slots are assigned for communication between the master device and one or more of the slave devices within a Bluetooth connection interval, while one or more additional time slots within the same Bluetooth connection interval are reserved for communication between the slave devices using the Bluetooth protocol or another communication protocol. In various embodiments, the present system allows the slave devices to communicate with each other using little or no media access control (MAC) layer support while in a Bluetooth connection with the master device. In one embodiment, in which the present system includes a hearing aid system, the left and right hearing aids communicate with one another for exchanging audio information or other data while in a Bluetooth connection with a hearing aid host device, such as a smartphone.

Figure 1:
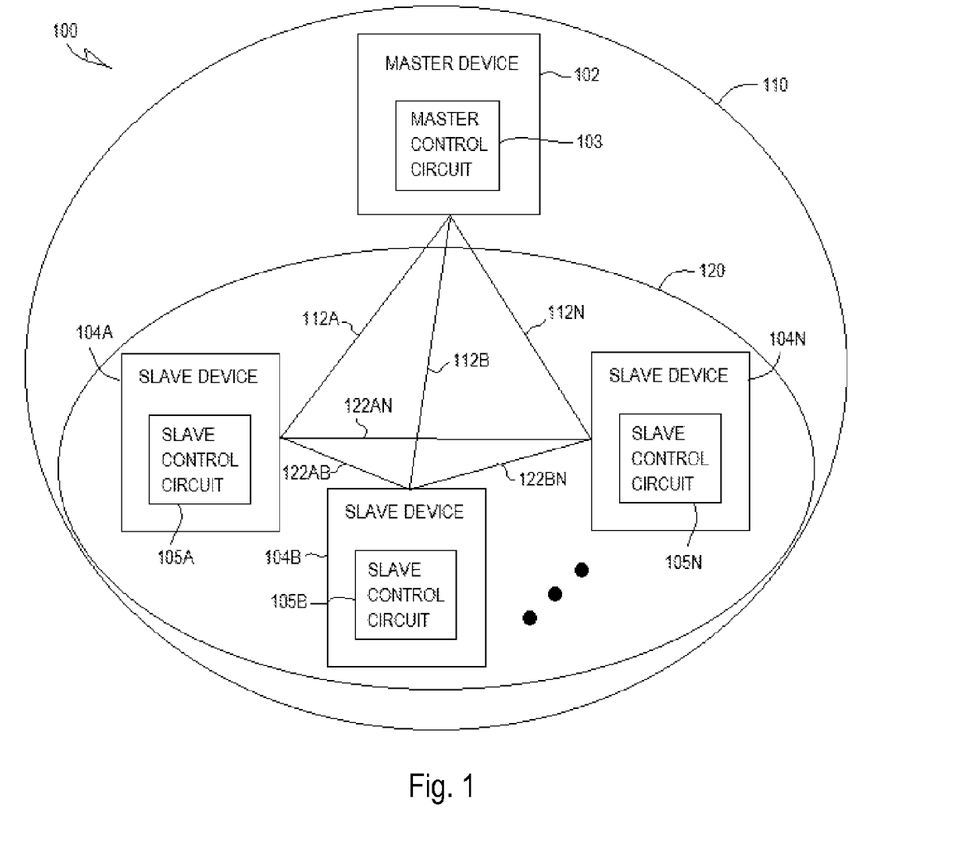
FIG. 1 is a block diagram illustrating an embodiment of a system including wireless communication networks providing communications for multiple devices.

FIG. 1 is a block diagram illustrating an embodiment of a system 100 including wireless communication networks providing communications for multiple devices. System 100 includes a master device 102 and a plurality of slave devices 104 (including 104A-N, where N can be any integer greater than 1). One example of system 100 includes a hearing assistance system, with master device 102 including a host device and the plurality of slave devices 104 including a plurality of hearing assistance devices, such as hearing aids.

System 100 includes a first network 110 and a second network 120. First network 110 includes master device 102, slave devices 104, and wireless communication links 112 (including 112A-N each coupled to the corresponding slave device 104A-N). Master device 102 includes a master control circuit 103. Slave devices 104 each include a slave control circuit, i.e., slave control circuit 105A-N each included in the corresponding device of slave device 104A-N. Wireless communication links 112 each communicatively couple one of slave devices 104 to master device 102. For example, as illustrated in FIG. 1, link 112A communicatively couples slave devices 104A to master device 102, link 112B communicatively couples slave devices 104B to master device 102, and link 112N communicatively couples slave devices 104N to master device 102.

In one embodiment, first network 110 is a piconet providing for wireless communication via wireless communication links 112 using a Bluetooth protocol. In one embodiment, the piconet is a Bluetooth low energy (BLE) network that provides for wireless communication via wireless communication links 112 using a BLE protocol.

In various embodiments, first network 110 provides for communication between master device 102 and each of slave devices 104 via wireless communication links 112, without providing for communication directly between any two of slave devices 104. One example is piconet 110 in which the Bluetooth protocol does not provide for such direct communication between the slave devices. Thus, system 100 includes second network 120 to provide for direct communication between slave devices 104. Second network 120 includes slave devices 104 and wireless communication links 122 (including 122AB, 122AN, 122BN, etc.). Wireless communication links 122 each communicatively coupling a slave device of slave devices 104 to another slave device of slave device 104. For example, as illustrated in FIG. 1, link 122AB communicatively couples slave devices 104A to slave device 104B, link 122AN communicatively couples slave devices 104A to slave device 104N, and link 122BN communicatively couples slave devices 104B to slave device 104N.

In one embodiment, second network 120 is another piconet providing for wireless communication via wireless communication links 122 using the Bluetooth protocol. One of slave device 104 may act as the master device for piconet 120. In one embodiment, piconet 120 is a BLE network that provides for wireless communication via wireless communication links 122 using the BLE protocol. In another embodiment, second network 120 provides for wireless communication via wireless communication links 122 using a proprietary protocol. In various embodiments, second network 120 provides for wireless communication via wireless communication links 122 using, for example, code division multiple access (CDMA), time division multiple access (TDMA), frequency-division multiple access (FDMA), or orthogonal frequency-division multiplexing (OFDM) technology.

In various embodiments, first network 110 provides any one or more of wireless communication links 112, and second network 120 includes any two or more of slave devices 104 with corresponding one or more wireless communication links 122. For example, master device 102 may communicate with each of slave device 104 directly via links 112, or communicate with one of slave device 104 directly via the corresponding link and communicate with other slave devices via links 122 through that slave device (e.g., communicate with slave device 104A directly via the corresponding link 112A and communicate with slave devices 104B-N via links 122 through slave device 102A).

System 100 includes a network control system including master control circuit 103 and slave control circuits 105. The network control system controls timing and frequency of communication over each link of wireless communication links 112 and each link of wireless communication links 122. In one embodiment, the network control system assigns one or more first time slots for the communication over each link of wireless communication links 112 within a Bluetooth connection interval and one or more second time slots for the communication over each link of the wireless communication links 122 within the Bluetooth connecting interval. The first and second time slots are non-overlapping in time. Thus, when first network 110 is a Bluetooth network, the communication over wireless communication links 122 is performed during time slots not used by the communication over wireless communication links 112 during the Bluetooth connection interval, and thus does not affect the communication in first network 110 that follows the Bluetooth protocol. In various embodiments, functions of the network control system may be distributed in master control circuit 103 and slave control circuits 105 in various manners based on design considerations.

In various embodiments, master control circuit 103 may control communication over wireless communication links 112 in a manner allowing for concurrent communication over wireless communication links 122, and slave control circuits 105 controls communication over wireless communication links 122. For example, master control circuit 103 may assign one or more first time slots for the communication over the each link of wireless communication links 112 during a Bluetooth connection interval while allowing for one or more second time slots for the communication over to be assigned to each link of wireless communication links 122 during the Bluetooth connecting interval. The first and second time slots are non-overlapping in time. In one example, master control circuit 103 further assigns the one or more second time slots. In another example, at least one of slave control circuit 105 assigns the one or more second time slots.

In various embodiments, the network control system also controls the frequency of communication in networks 110 and 120. Master control circuit 103 allocates a channel map and a hop sequence in addition to assigning the time slots to each of slave devices 104. In various embodiments, the channel maps for slave devices 104 are either the same for each salve device or known to each slave device, and the hop sequence is either synchronized or known by each slave device in communication with the master device. Slave devices 104 are configured to communicate with each other or with other peripheral devices. In various embodiments, when the time slots for communication to and from slave devices 104 are allocated as consecutive time slots in the Bluetooth connection, or are known for each salve device, the available (remaining, unused) time slots are used for proprietary communication outside of the Bluetooth connection. In order to utilize the physical layer state machines, the packets will have a structure similar to that of the Bluetooth connection.

The BLE protocol allows a master device to maintain connections with up to seven slave devices. Thus, when first network 110 provides for communication using the BLE technology, it can include master device 102 communicating with up to seven slave devices 104. In practice, the number of slave device may be lower than seven. When system 100 is a hearing assistance system including a hearing aid host device and a pair of left and right hearing aids, only two wireless links, one between the host device and the left hearing aid and the other between the host device and the right hearing aid, need to be maintained in first network 110. The host device acts as master device 102 and the left and right hearing aids act as slave devices 104. In various embodiments, master device 102 is configured to be the network controller using its link layer media access protocol to assign time slots and frequencies to slave devices 104. The Bluetooth protocol uses adaptive frequency hopping (AFH) to help mitigate interference and for system 100 to be regulatory compliant. In addition, other devices in the piconet 110 may be assigned time slots to receive and transmit information to and from master device 102. This multiple access scheme is known as time division multiple access (TDMA). The Bluetooth connection interval is used to allow slave devices 104 to be awake at certain intervals to receive information from, or send information to, the host device. It also facilitates a much lower duty cycle since slave devices 104 can go to sleep between connection intervals.

In various embodiments, the circuit of each element of system 100 including its various embodiments discussed in this document, for example master control circuit 103 and slave control circuits 105 and their various embodiments as discussed in this document, may be implemented using hardware, software, firmware or a combination of hardware, software and/or firmware. In various embodiments, the network control system including master control circuit 103 and slave control circuits 105 may be implemented using one or more circuits specifically constructed to perform one or more functions discussed in this document or one or more general-purpose circuits programmed to perform such one or more functions. Examples of such general-purpose circuit can include a microprocessor or a portion thereof, a microcontroller or portions thereof, and a programmable logic circuit or a portion thereof.

Figure 2:
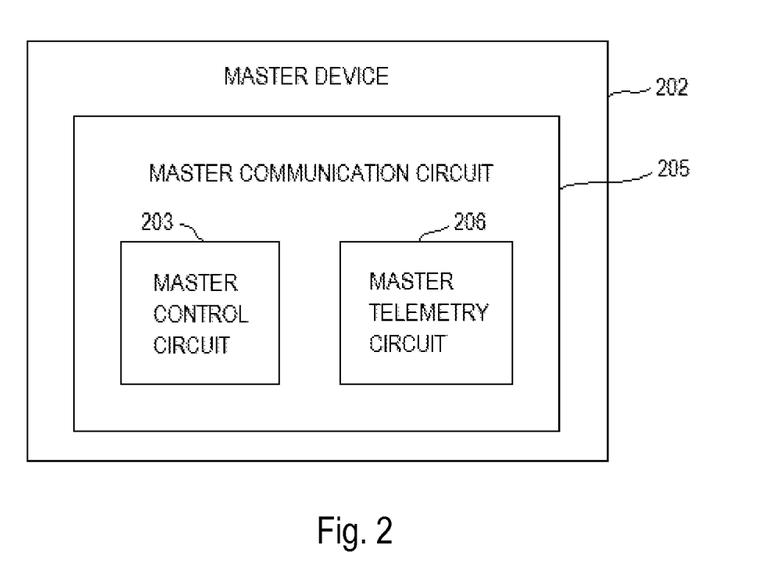
FIG. 2 is a block diagram illustrating an embodiment of a master device of the system.

FIG. 2 is a block diagram illustrating an embodiment of a master device 202, which represent an embodiment of master device 102. Master device 202 includes a master communication circuit 205, which provides master device 202 with wireless communication capabilities. Master communication circuit 205 includes a master control circuit 203 and a master telemetry circuit 206. Master telemetry circuit 206 transmits and receives signals using a link of wireless communication links 112. Master control circuit 203 controls the transmission and receiving of the signals and represents an embodiment of master control circuit 103.

Figure 3:
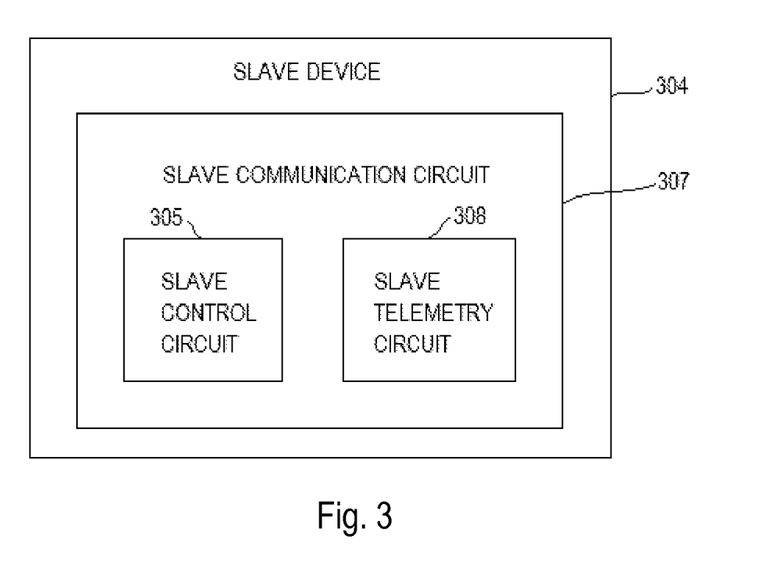
FIG. 3 is a block diagram illustrating an embodiment of a slave device of the system.

FIG. 3 is a block diagram illustrating an embodiment of a slave device 304, which represent an embodiment of one of slave devices 104. Slave device 304 includes a slave communication circuit 307, which provides slave device 304 with wireless communication capabilities. Slave communication circuit 307 includes a slave control circuit 305 and a slave telemetry circuit 308. Slave telemetry circuit 308 transmits and receives signals using a link of wireless communication links 112 and one or more links of wireless communication links 122. Slave control circuit 305 controls the transmission and receiving of the signals and represents an embodiment of slave control circuit 105.

In one embodiment, master control circuit 203 assigns one or more time slots for the communication over each link of wireless communication links 112 and 122 according to a timing sequence. In one embodiment, master control circuit 203 also allocates one or more frequency channels for the communication over each link of wireless communication links 112 and 122 according to a frequency channel map and a frequency hop sequence. Slave control circuit 205 controls communication over each link of wireless communication link(s) 122 using the one or more time slots and frequency channel assigned by master control circuit 203.

In another embodiment, master control circuit 203 assigns one or more first time slots for the communication over each link of wireless communication link 112 according to a first timing sequence. In one embodiment, master control circuit 203 also allocate a first frequency channel for the communication over each link of wireless communication link 112 according to a first frequency channel map and a first frequency hop sequence. Slave control circuit 205 assigns one or more second time slots for the communication over each link of wireless communication link 122 based on the one or more first time slots (i.e., occupied time slot(s)) and a second timing sequence. In one embodiment, slave control circuit 205 also allocates a second frequency channel for the communication over each link of wireless communication link 122 based on a second frequency channel map and a second frequency hop sequence.

Figure 4:
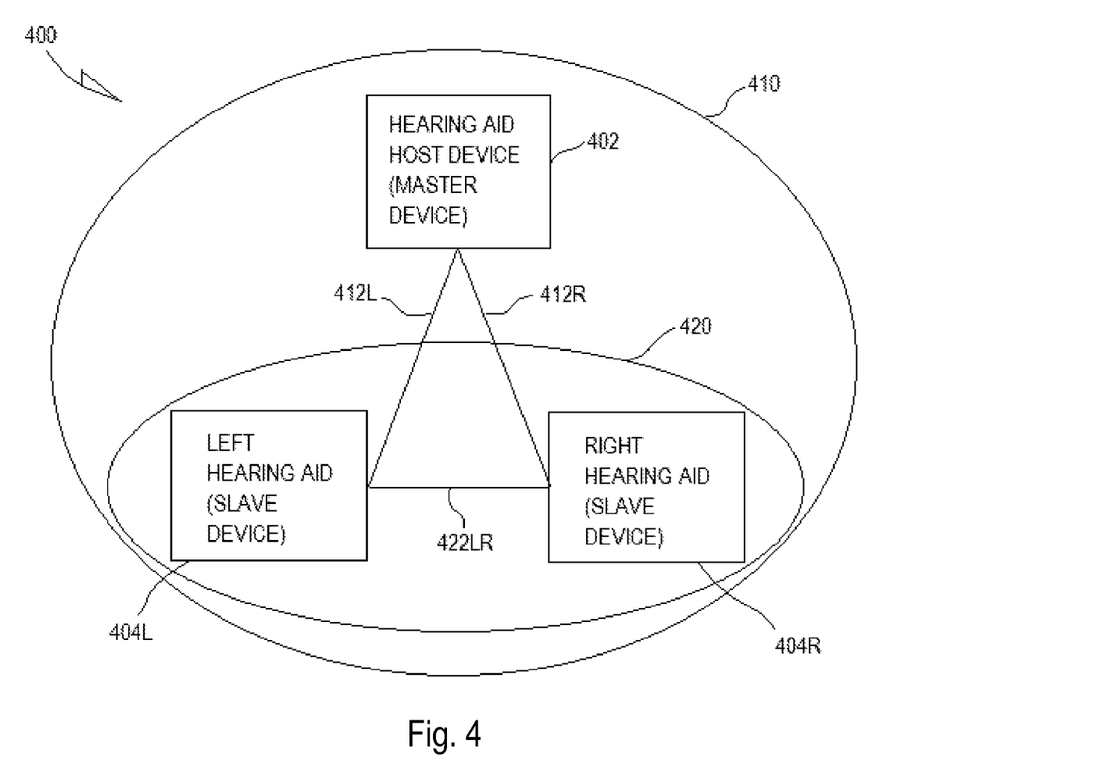
FIG. 4 is a block diagram illustrating an embodiment of a hearing aid system.

FIG. 4 is a block diagram illustrating an embodiment of a hearing aid system 400, which represents an embodiment of system 100. System 400 includes a first network 410 and a second network 420. First network 410 includes a hearing aid host device 402, a pair of a left hearing aid 404L and a right hearing aid 404R, and wireless communication links 412L and 412R. Hearing aid host device 402 functions as a master device in first network 410 and may include master device 202. Left and right hearing aids 404L-R each function as a slave device in first network 410 and may include slave device 304. Examples of host device 402 include a smartphone, a computer, an audio streaming device, and a dedicated hearing aid host device. Wireless communication link 412L communicatively couples left hearing aid 404L to host device 402. Wireless communication link 412R communicatively couples right hearing aid 404R to host device 402. In one embodiment, first network 410 is a piconet providing for wireless communication via wireless communication links 412L-R using a Bluetooth protocol. In one embodiment, the piconet is a BLE network that provides for wireless communication via wireless communication links 412L-R using a BLE protocol.

In various embodiments, first network 410 provides for communication between host device 402 and each of left and right hearing aids 404L-R via wireless communication link 412L-R, without providing for communication directly between left and right hearing aids 404L-R. One example is the piconet in which the Bluetooth protocol does not provide for such direct communication between left and right hearing aids 404L-R. Thus, system 400 includes second network 420 to provide for direct communication between left and right hearing aids 404L-R. Second network 420 includes left and right hearing aids 404L-R and a wireless communication link 422LR. Wireless communication link 422LR communicatively couples left and right hearing aids 404L-R to each other.

In one embodiment, second network 420 is another piconet providing for wireless communication via wireless communication link 422LR using the Bluetooth protocol. One of hearing aids 404L-R may act as the master device for second network 420. In one embodiment, piconet 420 is a BLE network that provides for wireless communication via wireless communication link 422LR using the BLE protocol. In another embodiment, second network 420 provides for wireless communication via wireless communication link 422LR using a proprietary protocol. In various embodiments, second network 420 provides for wireless communication via wireless communication link 422LR using, for example, CDMA, TDMA, FDMA, or OFDM technology.

In one embodiment, host device 402 assigns both hearing aids 404L-R consecutive time slots and uses the same frequency for each of hearing aids 404L-R in any given connection interval. Hearing aids 404L-R hop to the same frequencies at around the same time frame. In an idle connection (e.g., a connection for low data rate information or maintaining synchronization), there may be a significant amount of "dead time" during which bandwidth is not used for the Bluetooth communication over wireless communication links 412L-R. Within this "dead time" it may be possible for other communication, such as the communication over wireless communication link 422LR, to take place. In this case hearing aids 404L-R may communicate with each other, such as in an ear to ear communication through which hearing aids 404L-R can exchange audio or other data. If each of hearing aids 404L-R knows that they are already on the same frequency and the relative time of their sleep wake cycles, they can use the bandwidth not used by the Bluetooth communication to communicate. In this case one of hearing aids 404L-R may act as master and can use a communication similar to that which is used in Bluetooth or BLE communication to better utilize the protocol engines on the Bluetooth ASICs (application-specific integrated circuits). It is also possible to use a proprietary protocol to communicate between hearing aids 404L-R. Only a minor modification to the Bluetooth host device is needed to facilitate this communication between hearing aids 404L-R and/or other networked devices.

Figure 7:
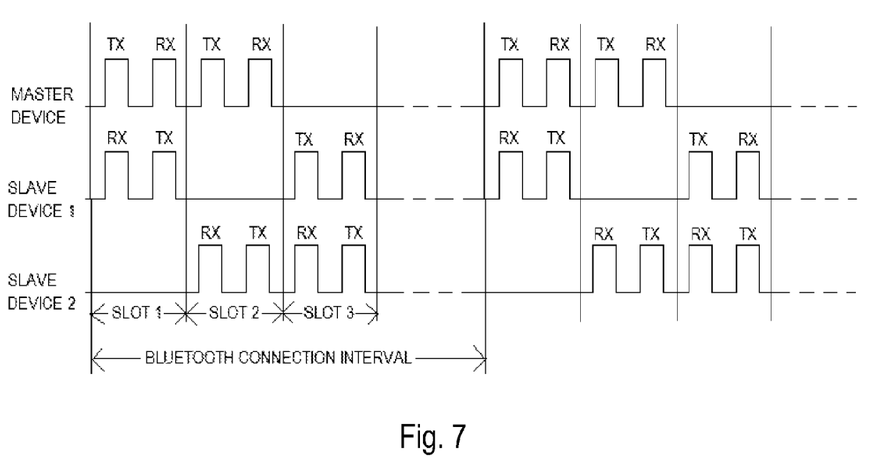
FIG. 7 is a timing diagram illustrating an embodiment of time slots for communication during a Bluetooth connection interval.

In one embodiment, frequency hopping is synchronized between hearing aids 404L-R. Hearing aids 404L-R are each given the same frequency map, the same starting frequency, and the same hop interval. In one embodiment (e.g., a classic Bluetooth protocol), hearing aids 404L-R are each given the same hop instructions. The time slots for hearing aids 404L-R are consecutive, with a slot used by left hearing aid 404L and the immediately adjacent slot used by right hearing aid 404R. An example of such time slots is illustrated in FIG. 7.

In another embodiment, hearing aids 404L-R are independently controlled. Hearing aids 404L-R are each provided with knowledge of the frequency map, hop sequence, and time slot of the other device(s) in first network 410 and second network 420 in order to facilitate communication. This approach requires greater current consumption because the devices must hop to meet each other, communicate, and hop back to where the host device is by the next connection interval.

Other embodiments are also available using various proprietary multiple access techniques and modulation schemes. In various embodiments, an simpler approach uses the same packet time slots and the same packet sizes allowed for the packets in a "normal communication mode", while more complicated approach may allow more time slots to be allocated for standard and/or non-standard communication protocols without deviating from the present subject matter.

Figure 5:
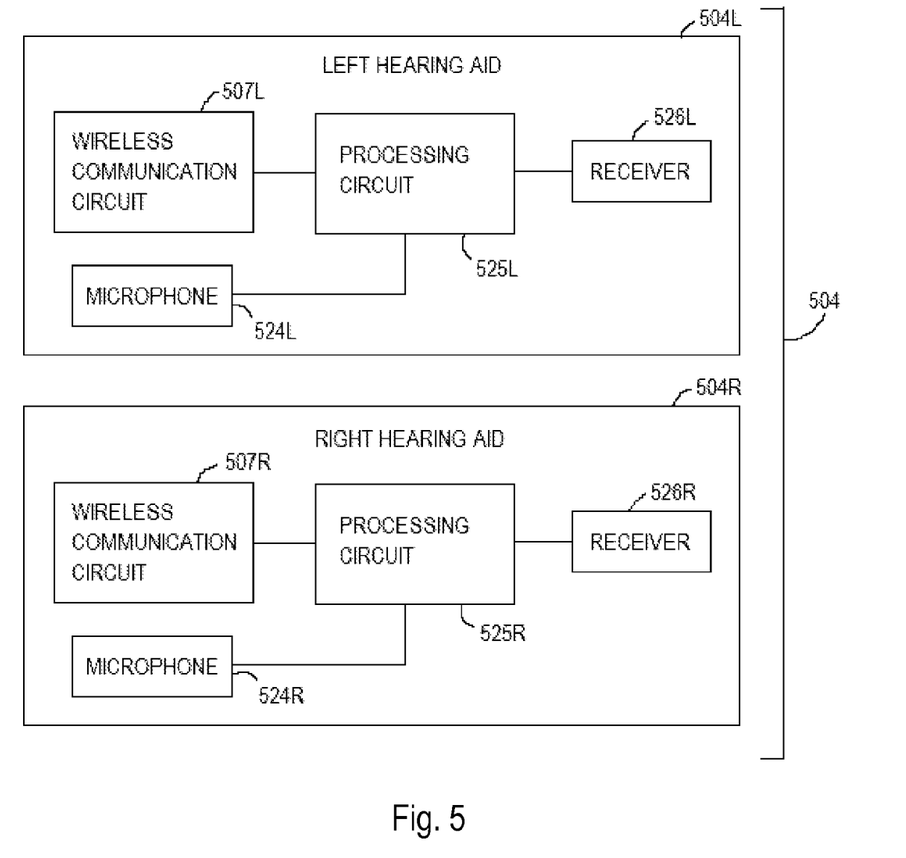
FIG. 5 is a block diagram illustrating an embodiment of a pair of hearing aids of the hearing aid system.

FIG. 5 is a block diagram illustrating an embodiment of hearing aid set 504 including a pair of a left hearing aid 504L and a right hearing aid 504R. Left hearing aid 504L represents an embodiment of left hearing aid 404L and includes a microphone 524L, a wireless communication circuit 507L, a processing circuit 525L, and a receiver 526L. Microphone 524L receives sounds from the environment of the hearing aid wearer. Wireless communication circuit 507L represents an embodiment of slave communication circuit 307 and wirelessly communicates with host device 402 and/or right hearing aid 504R, including receiving an audio signal from host device 402 directly or through right hearing aid 504R. Processing circuit 525L processes the sounds received by microphone 524L and/or the audio signal received by wireless communication circuit 507L to produce a left output sound. Receiver 526L transmits the left output sound to the left ear canal of the hearing aid wearer.

Right hearing aid 504R represents an embodiment of right hearing aid 404R and includes a microphone 524R, a wireless communication circuit 507R, a processing circuit 525R, and a receiver 526R. Microphone 524R receives sounds from the environment of the hearing aid wearer. Wireless communication circuit 507R represents an embodiment of slave communication circuit 307 and wirelessly communicates with host device 402 and/or left hearing aid 504L, including receiving an audio signal from host device 402 directly or through left hearing aid 504L. Processing circuit 525R processes the sounds received by microphone 524R and/or the audio signal received by wireless communication circuit 507R to produce a right output sound. Receiver 526R transmits the right output sound to the right ear canal of the hearing aid wearer.

Figure 6:
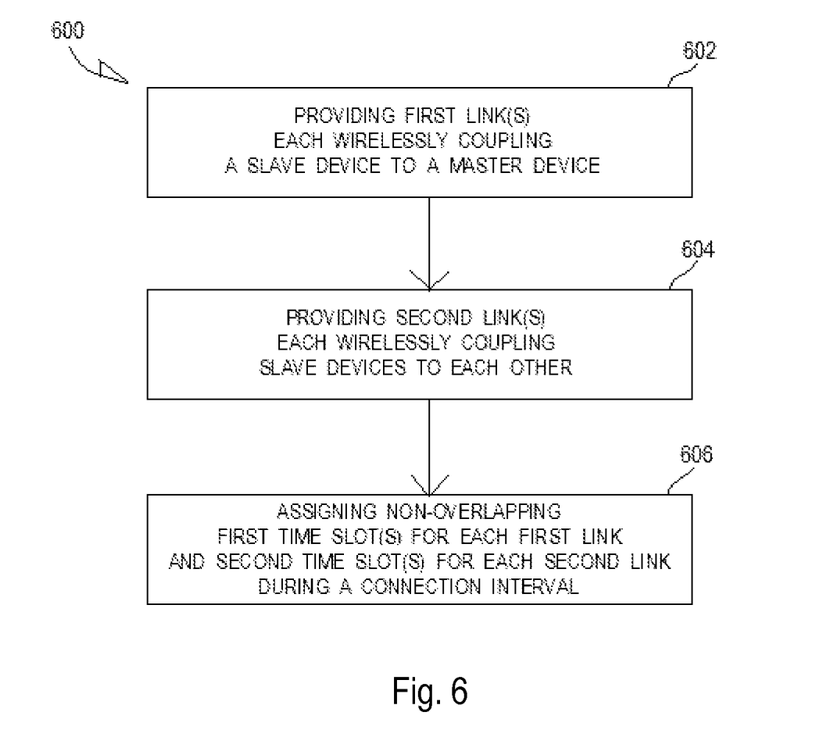
FIG. 6 is a flow chart illustrating an embodiment of a method allowing for communication between slave devices in a network.

FIG. 6 is a flow chart illustrating an embodiment of a method 600 that allows for communication between slave devices in a network. In one embodiment, method 600 is performed by system 100, including its various embodiments discussed in this document. The network control system, including various embodiments of master control circuit 103 and slave control circuits 105, is configured to perform method 600.

At 602, one or more first wireless communication links each communicatively coupling a slave device of a plurality of slave devices to a master devices are provided. In one embodiment, the plurality of slave devices includes a plurality of hearing assistance devices, and the master device includes a host device for the plurality of hearing assistance devices. In one embodiment, the one or more first wireless communication links each communicatively couple a hearing assistance device of the plurality of hearing assistance devices to the host device using a Bluetooth protocol. In one embodiment, the Bluetooth protocol is a BLE protocol. In one embodiment, the plurality of hearing assistance devices includes a pair of hearing aids for delivering sounds to a hearing aid wearer's left and right ears, and the host device is a hearing aid host device. In various embodiments, the hearing aid host device may be implemented as a dedicated device or in a smartphone, a computer, a music player, or an audio streaming device.

At 604, one or more second wireless communication links each communicatively coupling a slave device of the plurality of hearing assistance devices to another slave device of the plurality of slave devices are provided. In one embodiment, the one or more second wireless communication links each communicatively couple a hearing assistance device of the plurality of hearing assistance devices to another hearing assistance device of the plurality of hearing assistance devices. In one embodiment, the one or more first wireless communication links and the one or more second wireless communication links are both provided using the Bluetooth protocol, such as the BLE protocol. In another embodiment, the one or more first wireless communication links are provided using the Bluetooth protocol, and the one or more second wireless communication links are provided using a proprietary protocol.

At 606, one or more first time slots for communication over each first link of the one or more first wireless communication links and one or more second time slots for communication over each second link of the one or more second wireless communication links are assigned. The first and second time slots are non-overlapping in time. In one embodiment, the one or more first time slots and the one or more second time slots are assigned within a Bluetooth connection interval. In one embodiment, the one or more first time slots and the one or more second time slots are assigned by the master device according to a timing sequence. One or more frequency channels for the communication over the each of the one or more first wireless communication links and each of the second wireless communication links are also allocated by the master device according to a frequency channel map and a frequency hop sequence. In another embodiment, the one or more first time slots are assigned by the master device according to a first timing sequence, and the one or more second time slots are assigned by a slave device of the plurality of slave devices according to a second timing sequence. One or more first frequency channels for the communication over the one or more first wireless communication links are allocated by the master device according to a first frequency channel map and a first frequency hop sequence. One or more second frequency channels for the communication over the one or more second wireless communication links are assigned by a slave device of the plurality of slave devices based on a second frequency channel map and a second frequency hop sequence.

FIG. 7 is a timing diagram illustrating an embodiment of time slots for communication during a Bluetooth connection interval. For the purpose of illustration rather than restriction, the timing diagram is for communications in a network including a master device and two slave devices. In various embodiments, the illustrated time slot assignment may be applied to a network with two or more slave devices, with the limit set by the duration of the Bluetooth connection interval.

In the illustrated embodiment, a first time slot (SLOT 1) allows for communication between the master device and slave device 1, including data transmission (TX) by the master device and receiving (RX) by slave device 1 and data transmission (TX) by slave device 1 and receiving (RX) by the master device. A second time slot (SLOT 2) allows for communication between the master device and slave device 2, including data transmission (TX) by the master device and receiving (RX) by slave device 2 and data transmission (TX) by slave device 2 and receiving (RX) by the master device. A third time slot (SLOT 3) allows for communication between slave device 1 and slave device 2, including data transmission (TX) by slave device 1 and receiving (RX) by slave device 2 and data transmission (TX) by slave device 2 and receiving (RX) by slave device 1. When applied to system 100, for example, the first and second time slots allow for communication over wireless communication links 112, and the third time slot allow for communication over one of wireless communication links 122. When applied to system 400, for example, the first and second time slots allow for communication between hearing aid host device 402 and each of left hearing aid 404L and right hearing aid 404R, and the third time slot allow for communication between left hearing aid 404L and right hearing aid 404R.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices. It is understood that other hearing assistance devices not expressly stated herein may be used in conjunction with the present subject matter.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented using a data signal embodied in a carrier wave or propagated signal, that represents a sequence of instructions which, when executed by one or more processors cause the processor(s) to perform the respective method. In various embodiments, the methods are implemented as a set of instructions contained on a computer-accessible medium capable of directing a processor to perform the respective method. In various embodiments, the medium is a magnetic medium, an electronic medium, or an optical medium.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

What is claimed is:

1. A hearing assistance system, comprising:
   a host device including a master control circuit;
   a plurality of hearing assistance devices each including a slave control circuit;
   one or more first wireless communication links each configured to communicatively couple a hearing assistance device of the plurality of hearing assistance devices to the host device using a Bluetooth protocol;
   one or more second wireless communication links each configured to communicative couple a hearing assistance device of the plurality of hearing assistance devices to another hearing assistance device of the plurality of hearing assistance devices; and
   a network control system including the master control circuit and the slave control circuits, the network control system configured to assign one or more first time slots for the communication over each first link of the one or more first wireless communication links within a Bluetooth connection interval and one or more second time slots for the communication over each second link of the one or more second wireless communication links within the Bluetooth connection interval, the first and second time slots non-overlapping in time.

2. The system of claim 1, wherein the host device comprises a hearing aid host device, and the plurality of hearing assistance devices comprises a first hearing aid and a second hearing aid.

3. The system of claim 2, wherein the host device comprises a smartphone.

4. The system of claim 2, wherein the one or more second wireless communication links are each configured to communicatively couple a hearing assistance device of the plurality of hearing assistance devices to another hearing assistance device of the plurality of hearing assistance devices using the Bluetooth protocol.

5. The system of claim 2, wherein the one or more second wireless communication links are each configured to communicatively couple a hearing assistance device of the plurality of hearing assistance devices to another hearing assistance device of the plurality of hearing assistance devices using a proprietary protocol.

6. The system of claim 2, wherein the master control circuit is configured to assign the one or more first time slots while reserving time the one or more second time slots.

7. The system of claim 6, wherein the master control circuit is configured to assign the one or more first time slots and the one or more second time slots according to a timing sequence.

8. The system of claim 7, wherein the master control circuit is further configured to allocate one or more frequency channels for the communication over the each first link and the each second link according to a frequency channel map and a frequency hop sequence.

9. The system of claim 8, wherein the slave control circuits are configured to control communication over the each second link using the one or more second time slots assigned to the each second link and the frequency channel allocated for the each second link.

10. The system of claim 6, wherein the master control circuit is configured to assign the one or more first time slots according to a first timing sequence, and a first slave control circuit of the slave control circuits is configured to assign the one or more second time slots based on the one or more first time slots and a second timing sequence.

11. The system of claim 10, wherein the master control circuit is further configured to allocate a first frequency channel for the communication over the each first link according to a first frequency channel map and a first frequency hop sequence, and the first slave control circuit is further configured to allocate a second frequency channel for the communication over the each second link based on a second frequency channel map and a second frequency hop sequence.

12. A method for wireless communication in a hearing assistance system, the method comprising:
    providing one or more first wireless communication links each communicatively coupling a hearing assistance device of a plurality of hearing assistance devices to a host device using a Bluetooth protocol;
    providing one or more second wireless communication links each communicatively coupling a hearing assistance device of the plurality of hearing assistance devices to another hearing assistance device of the plurality of hearing assistance devices; and
    assigning one or more first time slots for communication over each first link of the one or more first wireless communication links during a Bluetooth connection interval and one or more second time slots for communication over each second link of the one or more second wireless communication links during the Bluetooth connection interval, the first and second time slots non-overlapping in time.

13. The method of claim 12, wherein providing the one or more second wireless communication lines comprises providing the one or more second wireless communication links using the Bluetooth protocol.

14. The method of claim 12, wherein providing the one or more second wireless communication lines comprises providing the one or more second wireless communication links using a proprietary protocol.

15. The method of claim 12, wherein providing the one or more first wireless communication links comprises providing the one or more first wireless communication links each communicatively coupling a hearing aid of a pair of first and second hearing aids to a hearing aid host device, and providing one or more second wireless communication links comprises providing a second wireless communication link communicatively coupling the first and second hearing aids.

16. The method of claim 15, wherein assigning the one or more first time slots and the one or more second time slots comprises assigning the one or more first time slots and the one or more second time slots according to a timing sequence using the hearing aid host device.

17. The method of claim 16, further comprising allocating one or more frequency channels for the communication over the each first link and the each second link according to a frequency channel map and a frequency hop sequence using the hearing aid host device.

18. The method of claim 15, wherein assigning the one or more first time slots comprises assigning the one or more first time slots according to a first timing sequence using the hearing aid host device, and assigning the one or more second time slots comprises assigning the one or more second time slots according to a second timing sequence using a hearing aid of the pair of the first and second hearing aids.

19. The method of claim 18, further comprising allocate a first frequency channel for the communication over the each first link according to a first frequency channel map and a first frequency hop sequence using the hearing aid host device.

20. The method of claim 19, further comprising allocating a second frequency channel for the communication over the each second link based on a second frequency channel map and a second frequency hop sequence using the hearing aid of the pair of the first and second hearing aids.

21. A hearing assistance system, comprising:
   a first network being a first piconet including:
      a host device being a master device including a master control circuit;
      a plurality of hearing assistance devices each being a slave device including a slave control circuit; and
      one or more first wireless communication links each communicatively coupling a hearing assistance device of the plurality of hearing assistance devices to the host device using a Bluetooth protocol;
   a second network including:
      two or more hearing assistance devices of the plurality of hearing assistance devices; and
      one or more second wireless communication links each communicatively coupling a hearing assistance device of the two or more hearing assistance devices to another hearing assistance device of the two or more hearing assistance devices; and
   a network control system including the master control circuit and the slave control circuits, the network control system configured to assign one or more first time slots for the communication over each first link of the one or more first wireless communication links during a Bluetooth connection interval and one or more second time slots for the communication over each second link of the one or more second communication links during the Bluetooth connection interval, the first and second time slots non-overlapping in time.

22. The system of claim 21, wherein the host device comprises a hearing aid host device, and the two or more hearing assistance devices of the second network comprise a first hearing aid and a second hearing aid.

23. The system of claim 22, wherein the first network is configured to provide for wireless communication via the one or more first wireless communication links using a Bluetooth low energy (BLE) protocol.

24. The system of claim 23, wherein the second network comprises a second piconet configured to provide for wireless communication via the one or more second communication links using the BLE protocol.

25. The system of claim 23, wherein the second network comprises a second piconet configured to provide for wireless communication via the one or more second communication links using a proprietary protocol.

* * * * *